United States Patent [19]

Kochanowski et al.

[11] 4,322,333
[45] Mar. 30, 1982

[54] REINFORCED PBT-COPOLYAROMATIC/ALIPHATIC BLOCK COPOLYESTERS

[75] Inventors: John E. Kochanowski, Monterey, Mass.; Allen D. Wambach, Monroeville, Pa.

[73] Assignee: General Electric Company, Pittsfield, Mass.

[21] Appl. No.: 90,989

[22] Filed: Nov. 5, 1979

[51] Int. Cl.³ .......................... C08K 3/34; C08L 67/02
[52] U.S. Cl. .................................. 523/521; 525/176; 525/444; 525/448; 523/522; 523/527
[58] Field of Search ...................... 525/176, 444, 448; 260/40 R

[56] References Cited

U.S. PATENT DOCUMENTS

| | | | |
|---|---|---|---|
| 2,465,319 | 3/1949 | Whinfield et al. | 526/71 |
| 3,047,539 | 7/1962 | Pengilly | 528/285 |
| 3,580,965 | 5/1971 | Brinkmann et al. | 525/176 X |
| 3,907,926 | 9/1975 | Brown et al. | 525/444 X |
| 3,937,757 | 2/1976 | Seydl et al. | 525/176 X |
| 3,953,394 | 4/1976 | Fox et al. | 525/176 X |
| 3,963,800 | 6/1976 | Gipp | 525/444 |
| 4,013,613 | 3/1977 | Abolins et al. | 525/176 X |
| 4,064,098 | 12/1977 | Saitoh et al. | 525/444 X |
| 4,122,061 | 10/1978 | Holub et al. | 525/176 X |
| 4,212,791 | 7/1980 | Avery et al. | 260/40 R |

OTHER PUBLICATIONS

UK Patent Application GB 2011443, Corresponding to U.S. Ser. No. 866,059, published 7-11-1979.

*Primary Examiner*—Lewis T. Jacobs
*Assistant Examiner*—Robert E. L. Sellers
*Attorney, Agent, or Firm*—Morgan, Finnegan, Pine, Foley & Lee

[57] ABSTRACT

A thermoplastic molding composition having improved impact strength is provided, the composition comprising a thermoplastic resin selected from (i) a poly(1,4-butylene terephthalate) in combination with a poly(ethylene terephthalate) resin, mineral-filled, or (ii) a poly(1,4-butylene terephthalate) co-aromatic/aliphatic polyester, reinforced and/or mineral-filled, and a minor, effective amount of a copolymer of ethylene and vinyl acetate or a terpolymer of ethylene, vinyl acetate and methacrylic and/or acrylic acid.

11 Claims, No Drawings

REINFORCED PBT-COPOLYAROMATIC/ALIPHATIC BLOCK COPOLYESTERS

This invention relates to improved thermoplastic molding compositions and, more particularly, to improved filled and/or reinforced thermoplastic polyester and copolyester molding compositions.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319, and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection-moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction. Recently, block copolyesters, wherein the major portion of the repeating units are poly(1,4-butylene terephthalate) blocks, have been found to have enhanced impact resistance. See Borman et al., U.S. Pat. Application Ser. No. 752,325, filed on Dec. 20, 1976. Brinkman et al., U.S. Pat. No. 3,580,965 disclose that the impact strength of linear high molecular weight polyesters can be improved by adding α-olefin-vinyl ester copolymers. Seydl et al., U.S. Pat. No. 3,937,757 disclose that poly(1,4-butylene terephthalate) can have its electrical arc tracking resistance improved by adding polyolefins, among which is suggested a copolymer of ethylene and vinyl acetate. Holub et al. U.S. Pat. No. 4,122,061 describe glass-reinforced combinations of poly(1,4-butylene terephthalate) and poly(ethylene terephthalate) to which olefin based copolymer resins can be added in surprisingly small amounts to provide improved impact strengths. Cohen et al., U.S. Ser. No. 866,059, filed Dec. 30, 1977 and Cohen, U.S. Ser. No. 866,008, filed Dec. 30, 1977, disclose, respectively, the use of small amounts of ethylene-vinyl acetate copolymer to improve the impact strength of unreinforced, unfilled poly(1,4-butylene terephthalate) and to improve the mold release of talc-filled poly(1,4-butylene terephthalate) or a block copolyester thereof with aliphatic/aromatic polyesters. The disclosures of the above-mentioned patents and applications are incorporated herein by reference.

It has now been discovered that if a small amount of a olefin-based copolymer is incorporated in compositions comprising mineral-filled polyester resin combinations or mineral-filled and/or reinforced block copolyesters, the compositions exhibit vastly improved impact strengths. Also the deflection temperature under load (DTUL) is reduced by less than the expected amount, and the modulus is decreased only slightly. Such results permit the achievement of physical properties heretofore obtained only by post-reaction (solid state polymerization) of prior art compositions.

DETAILED DESCRIPTION OF THE INVENTION

According to this invention there are provided thermoplastic compositions which are useful for molding or extrusion, e.g., injection molding, injection blow molding, compression molding, transfer molding, profile extrusion, sheet extrusion, wire coating, extrusion blow molding and the like, the compositions have improved impact strength and other good physical properties after molding, such as good surface appearance, said compositions comprising:

(a) a thermoplastic resin selected from
  (i) a poly(1,4-butylene terephthalate) resin in combination with a poly(ethylene terephthalate) resin and an effective amount of a mineral filler therefor; or
  (ii) a poly(1,4-butylene terephthalate)-copolyaromatic/aliphatic block copolyester resin, alone or in combination with a poly(1,4-butylene terephthalate) resin and an effective amount of a reinforcing agent, a mineral filler or a combination thereof; and (b) an effective, impact strength improving amount of
  (i) a copolymer of ethylene and vinyl acetate;
  (ii) a terpolymer of ethylene, vinyl acetate, methacrylic acid or acrylic acid; or
  (iii) a mixture of (i) and (ii).

In preferred compositions said block copolyesters are derived from
  (i) a terminally-reactive poly(1,4-butylene terephthalate) and
  (ii) a terminally-reactive aromatic/aliphatic copolyester of a dicarboxylic acid selected from the group consisting of terephathalic acid, isophthalic acid, naphthalene dicarboxylic acids, phenyl indane dicarboxylic acid and compounds of the formula:

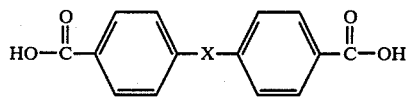

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid, or (iii) a terminally-reactive aliphatic polyester of a straight chain aliphatic dicarboxylic acid having from 4 to 12 carbon atoms in the chain and a straight or branched chain aliphatic glycol, said blocks being connected by inter terminal linkages consisting essentially of ester linkages.

The high molecular weight linear polyesters used in the practice of the present invention are polymeric glycol esters of terephthalic acid and isophthalic acids. They are available commercially or can be prepared by known techniques, such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539, and elsewhere.

An especially preferred polyester is poly(1,4-butylene terephthalate) because it crystallizes at such a good rate that it may be used for injection molding without the need for nucleating agents or long cycles, as is sometimes necessary with poly(ethylene terephthalate).

Illustratively, high molecular weight thermoplastic resins (a)(i) or (a)(ii) will have an intrinsic viscosity of at least about 0.4 deciliters/gram and, preferably, at least 0.7 deciliters/gram as measured in a 60:40 phenol-tetrachloroethane mixture at 30° C. At intrinsic viscosities of at least about 1.1 deciliters/gram, there is a further enhancement in toughness of the present compositions.

The block copolyesters useful in the composition of this invention are prepared by the reaction of terminally-reactive poly(butylene terephthalate), preferably, low molecular weight, and a terminally-reactive copolyester or polyester in the presence of a catalyst for transesterification, such as zinc acetate, manganese acetate, titanium esters, and the like. The terminal groups can comprise hydroxyl, carboxyl, carboalkoxy, and the like, including reactive derivatives thereof. The result of reaction between two terminally reactive groups, of course, must be an ester linkage. After initial mixing, polymerization is carried out under standard conditions, e.g., 220° to 280° C., in a high vacuum, e.g., 0.1 to 2 mm Hg, to form the block copolymer of minimum randomization in terms of distribution of chain segments. These copolyesters are described in above-mentioned U.S. application Ser. No. 752,325.

The copolyester designated component (ii), hereinabove, is preferably prepared from terephthalic acid or isophthalic acid or a reactive derivative thereof and a glycol, which may be a straight or branched chain aliphatic glycol. Illustratively, the glycol will be 1,4-butanediol; 1,5-pentanediol; 1,6-hexanediol; 1,9-nonanediol; 1,10-decanediol; neopentyl glycol; 1,4-cyclohexanediol; 1,4-cyclohexane dimethanol, a mixture of any of the foregoing, or the like. Illustrative of suitable aliphatic dicarboxylic acids for the mixed aromatic/aliphatic embodiments are suberic, sebacic, azelaic, adipic acids and the like.

The copolyesters may be prepared by ester interchange in accordance with standard procedures. The copolyesters designated (ii) are most preferably derived from an aliphatic glycol and a mixture of aromatic and aliphatic dibasic acids in which the mole ratio concentration of aromatic to aliphatic acids is from between 1 to 9 and 9 to 1, with an especially preferred range being from about 3 to 7 to about 7 to 3.

The terminally reactive aliphatic polyesters designated component (iii) will contain substantially stoichiometric amounts of the aliphatic diol and the aliphatic dicarboxylic acid, although hydroxy-containing terminal groups are preferred.

In addition to their ease of formation by well-known procedures, both the aromatic/aliphatic copolyesters (ii) and the aliphatic polyesters (iii) are commercially available. One source for such materials is the Ruco Division/Hooker Chemical Company, Hicksville, N.Y., which designates its compounds as "Rucoflex."

The block copolyesters used in the invention preferably comprise from 95 to 50 parts by weight of the segments of poly(1,4-butylene terephthalate). The poly(1,4-butylene terephthalate) blocks, before incorporation into the block copolyesters, will preferably have an intrinsic viscosity of above 0.1 dl./g. and preferably, between 0.1 and 0.5 dl./g., as measured in a 60:40 mixture of phenol/tetrachloroethane at 30° C. The balance, 5 to 50 parts by weight of the copolyester will comprise blocks of components (ii) or (iii), preferably poly(1,6-hexylene-azelate-co-isophthalate).

As will be understood by those skilled in the art, the poly(1,4-butylene terephthalate) block can be straight chain or branched, e.g., by use of a branching component, e.g., 0.05 to 1 mole %, based on terephthalate units, of a branching component which contains at least three ester-forming groups. This can be a glycol, e.g., pentaerythritol, trimethylolpropane, and the like, or a polybasic acid compound, e.g., trimethyl trimestate, and the like.

The olefin-based copolymer additives of the present invention are selected from polyethylene-vinyl acetate copolymer, ethylene-vinyl acetate-acrylic acid terpolymer, ethylene-vinyl acetate-methacrylic acid terpolymer, and the like. These polymers are well known to those skilled in the art and for the most part are commercially available.

The ethylene-vinyl acetate copolymers typically will contain from 10 to 30% vinyl acetate units. Suitable commercial forms are DuPont's Alathon 3892 and 3180, the latter containing 28% vinyl acetate and having a melt index of 25 gms./10 min. The terpolymers range in vinyl acetate content from 20-30% and have acid numbers of 4-8 mg. KOH/g. of polymers. They are sold by DuPont under the trade name Elvax. Typical are Elvax 4355 and Elvax 4260, both of which are suitable in the present invention. In general, the olefin-based copolymer additive is employed in amounts ranging from about 0.05 to about 10 parts by weight per 100 parts by weight of the resinous components of the composition. Preferably, from about 0.1 to about 4.5 parts by weight per 100 parts by weight of the total resinous components in the composition, is employed.

The compositions will include, as indicated, reinforcements and/or mineral fillers of well known types and in conventional amounts.

Reinforcements will add to the strength of workpieces molded from the compositions and these generally comprise glass filaments or fibers, which are preferred, carbon fibers, asbestos fibers, metallic fibers or whiskers, and the like. Reinforcing amounts will comprise from about 2 to about 60 parts by weight per 100 parts by weight of the composition, preferably from about 15 to about 45 parts and especially preferably, from about 20 to about 40 parts by weight.

Mineral fillers are employed for purposes other than reinforcement, e.g., to lower specific gravity, to enhance heat resistance, to modify electrical properties, and the like. Illustrative such fillers are clay, mica, silica, glass flakes, metallic oxides, talc, carbon, and the like. These can be used in conventional amounts, generally from about 2 to about 150 parts by weight per 100 parts by weight of the composition. Preferably from about 15 to about 50 parts by weight of mineral filler, e.g., clay or talc, will be used.

If a reinforcing agent is used in combination with a mineral filler, the ratio can vary widely, e.g., from about 95 to 5 to about 5 to 95 parts by weight. Moreover, the amount of the combination can vary from about 2 to about 150 parts by weight per 100 parts by weight of the composition and preferably from about 15 to about 50 parts by weight, same basis.

The compositions of the present invention are prepared in conventional ways. For example, in one way, the ethylene-based copolymer, or terpolymer and reinforcing agent and/or filler are all put into an extrusion compounder with the thermoplastic resin to produce molding pellets. The ethylene-based copolymer or terpolymer and filler and/or reinforcing agent, are dispersed in a matrix of the thermoplastic in the process. In another procedure, the ethylene-based copolymer or terpolymer is mixed with the thermoplastic resin and filler and/or reinforcement by dry blending, then either fluxed on a mill and comminuted, or they are extruded and chopped. The ethylene-based copolymer or terpolymer and filler and/or reinforcement can also be mixed with the powdered or granular thermoplastic resin and directly molded, e.g., by injection or transfer molding techniques. It is always important to thoroughly free the thermoplastic resin from as much water as possible.

In addition, compounding should be carried out to ensure that the residence time in the machine is short; the temperature is carefully controlled, the friction heat is utilized, and an intimate blend between the other ingredients and the thermoplastic resin is obtained.

Although it is not essential, best results are obtained if the ingredients are pre-compounded, pelletized, and then molded. Pre-compounding can be carried out in conventional equipment. For example, after carefully pre-drying the thermoplastic resin, e.g., at 125° C. for 4 hours, a single screw extruder is fed with a dry blend of the polyester and the ethylene-based copolymer or terpolymer, the screw employed having a long transition and metering section to ensure melting. On the other hand, a twin screw extrusion machine, e.g., a 28 mm Werner Pfleiderer machine can be fed with resin and additives at the feed port. In either case, a generally suitable machine temperature will be about 450° to 570° F.

The pre-compounded composition can be extruded and cut up into molding compounds such as conventional granules, etc., by standard techniques.

The compositions of this invention can be molded in any equipment conventionally used for thermoplastic compositions. For example, good results will be obtained in an injection molding machine, e.g., of the Newbury type with conventional cylinder temperature, e.g., 450° F. and conventional mold temperatures, e.g., 150° F.

In order that those skilled in the art may better understand how to practice the present invention, the following examples are given by way of illustration and not by way of limitation.

EXAMPLE 1

The following composition is mechanically blended, then extruded, and molded into test pieces in an injection molding machine. For comparison purposes a composition omitting the ethylene-vinyl acetate copolymer is compounded and tested. The formulations employed and the property data obtained are set forth in Table 1:

TABLE 1

Composition Comprising Mineral-filled Poly-(1,4-butylene terephthalate, Poly(ethylene terephthalate) and Ethylene-Vinyl Acetate

| Example | 1 | 1A* |
|---|---|---|
| Composition (parts by weight) | | |
| Poly(1,4-butylene terephthalate)[a] | 55.5 | 60 |
| Poly(ethylene terephthalate)[b] | 20.0 | 20.0 |
| Clay[c] | 20.0 | 20.0 |
| Ethylene-vinyl acetate copolymer[d] | 4.5 | — |
| Stabilizer[e] | 0.1 | 0.1 |
| Properties | | |
| Deflection Temperature under load at 264 psi, °F. | 146 | 157 |
| Notched Izod impact, ft. lbs./in. | 1.0 | 0.7 |
| Unnotched Izod impact, ft. lbs./in. | 23.8 | 6.1 |
| Flexural strength, psi | 14,300 | 15,600 |
| Flexural modulus, psi | 477,000 | 573,000 |
| Tensile strength, psi | 8,100 | 9,300 |
| Gardner Impact, in. lbs. | 180 | 8 |

*Control
[a] General Electric Co., Valox 315
[b] Goodyear VFR-738-A7C (0.62 I.V.)
[c] Translink 445, an A-1100 surface-treated Whitex Clay
[d] Alathon 3180 from DuPont
[e] Ferro 904

The remarkable increase in impact strength upon addition of only 4.5% of ethylene-vinyl acetate copolymer is clearly evident.

EXAMPLES 2-4

A series of compositions are blended, extruded and molded from a copolyester comprising poly(1,4-butylene terephthalate) and aromatic/aliphatic polyester units in combination with poly(1,4-butylene terephthalate) and ethylene-vinyl acetate copolymer. Glass reinforcement is included in one, clay filler in another. For comparison purposes, compositions omitting the ethylene-vinyl acetate copolymer are also prepared and tested. The formulations used and the results obtained are set forth in Table 2:

TABLE 2

Copolyesters Comprising Poly(1,4-butylene terephthalate), Reinforced or Filled, and Ethylene-vinyl Acetate Copolymer

| Example | 2 | 2A* | 3 | 3A* | 4 | 4A* |
|---|---|---|---|---|---|---|
| Composition (parts by weight) | | | | | | |
| Copolyester of Poly(1,4-butylene terephthalate) and poly(hexylene co-isophthalate azelate | 47.8 | 50 | 40.2 | 42.5 | 37.8 | 40 |
| Poly(1,4-butylene terephthalate)[b] | 47.8 | 50 | 40.2 | 42.5 | 37.8 | 40 |
| Glass fiber reinforcement | — | — | 15 | 15 | — | — |
| Clay[c] | — | — | — | — | 20 | 20 |
| Ethylene-vinyl acetate copolymer[d] | 4.5 | — | 4.5 | — | 4.5 | — |
| Stabilizer[e] | 0.1 | 0.1 | 0.1 | 0.1 | 0.1 | 0.1 |
| Properties | | | | | | |
| Deflection Temp. under load at 264 psi, °F. | — | — | 341 | 334 | 131 | 160 |
| Notched Izod impact, ft. lbs./in. | 1.3 | 1.1 | 1.9 | 1.1 | 1.2 | 1.0 |

TABLE 2-continued
Copolyesters Comprising Poly(1,4-butylene terephthalate), Reinforced or Filled, and Ethylene-vinyl Acetate Copolymer

| Example | 2 | 2A* | 3 | 3A* | 4 | 4A* |
|---|---|---|---|---|---|---|
| Unnotched Izod impact, ft. lbs./in. | 2 N.B.<br>3 at 42.5 | 2 N.B.<br>3 at 24.2 | 12.6 | 10.0 | 24.7 | 13.9 |
| Flexural strength, psi | 11,200 | 12,300 | 17,400 | 18,800 | 12,500 | 14,600 |
| Flexural modulus, psi | 312,000 | 344,000 | 537,000 | 614,000 | 430,000 | 505,000 |
| Tensile strength, psi | 6,200 | 6,800 | 11,200 | 11,900 | 7,000 | 8,100 |
| Elongation, % | 337 | 350 | — | — | | |
| Gardner impact, in. lbs. | 375 | 350 | 60 | 40 | 100 | 36 |

*Control
**No Break
$^{b,c,d\ \&\ e}$see footnotes to Table 1.

It is seen that the ethylene-vinyl acetate copolymer is a highly effective impact modifier, and it also improves ductile impact strength (Gardner).

Obviously, other modifications of the present invention will suggest themselves to those skilled in this art in light of the above-detailed description. For example, a terpolymer of ethylene-vinyl acetate-methacrylic acid or a terpolymer of ethylene-vinyl acetate-acrylic acid, having a vinyl acetate content of 20-30% and an acid number in the range of 4-8 mg. KOH/g. polymer can be substituted for the ethylene-vinyl acetate copolymer. Talc can be substituted for the clay. Clay and glass fibers can be used in combination. It is, therefore, to be understood that changes may be made in the particular embodiments of the invention described which are within the full intended scope of the appended claims.

I claim:

1. A composition, having improved impact strength, comprising:
   (a) a poly(1,4-butylene terephthalate)-copolyaromatic/aliphatic block copolyester resin, alone, or in combination with a poly(1,4-butylene terephthalate) resin and an effective amount of a reinforcing agent, a mineral filler or a combination thereof; and
   (b) an effective, impact strength improving amount of (i) a copolymer of ethylene and vinyl acetate; (ii) a terpolymer of ethylene, vinyl acetate, acrylic acid or acrylic acid; or (iii) a mixture of (i) and (ii).

2. A composition as defined in claim 1 which contains block copolyester component (a) wherein said block copolyester is derived from blocks of
   (i) a terminally reactive poly(1,4-butylene terephthalate) and
   (ii) a terminally-reactive aromatic/aliphatic copolyester of a dicarboxylic acid selected from the group consisting of terephthalic acid, isophthalic acid, naphthalene dicarboxylic acids, phenyl indane dicarboxylic acid and compounds of the formula

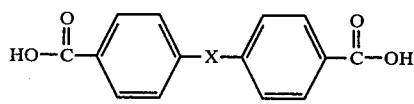

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid; or
   (iii) a terminally-reactive aliphatic polyester of a straight chain aliphatic dicarboxylic acid having from 4 to 12 carbon atoms in the chain and a straight or branched chain aliphatic glycol, said blocks being connected by inter-terminal linkages consisting essentially of ester linkages.

3. A composition as defined in claim 1 wherein said block copolyester resin has an intrinsic viscosity of at least about 0.4 deciliters per gram when measured in a solution in a 60:40 mixture of phenol and trichloroethane at 30° C.

4. A composition as defined in claim 2 wherein said resin is a block copolyester derived from blocks of
   (i) a terminally-reactive poly(1,4-butylene terephthalate) and
   (ii) a copolyester of isophthalic acid and a straight chain aliphatic dicarboxylic acid having from 6 to 12 carbon atoms in the chain with one or more straight or branched chain dihydric aliphatic glycols having from 4 to 10 carbon atoms in the chain.

5. A composition as defined in claim 4 wherein said block copolyester is derived from blocks of
   (i) a terminally-reactive poly(1,4-butylene terephthalate) and
   (ii) a polyester of a straight chain aliphatic dicarboxylic acid having from 6 to 12 carbon atoms and a branched chain dihydric aliphatic glycol.

6. A composition as defined in claim 4 wherein said block copolyester is derived from blocks of
   (i) terminally-reactive poly(1,4-butylene terephthalate) and
   (ii) poly(1,6-hexylene-azelate-co-isophthalate).

7. A composition as defined in claim 1 wherein said reinforcing agent comprises glass fibers.

8. A composition as defined in claim 1 wherein said mineral filler comprises clay.

9. A composition as defined in claim 1 wherein said combination of reinforcing agent and mineral filler comprises glass fibers and clay.

10. A composition as defined in claim 1 wherein said component (b) comprises from about 0.05 to about 10 parts by weight per 100 parts by weight of the resinous components in said composition.

11. A composition as defined in claim 1 wherein said component (b) comprises from about 0.1 to about 4.5 parts by weight per 100 parts by weight of the resinous components in said composition.

* * * * *

UNITED STATES PATENT AND TRADEMARK OFFICE
CERTIFICATE OF CORRECTION

PATENT NO. : 4,322,333
DATED : March 30, 1982
INVENTOR(S) : John E. Kochanowski et al.

It is certified that error appears in the above—identified patent and that said Letters Patent is hereby corrected as shown below:

At column 7, line 43 after "vinyl acetate," delete "acrylic acid" and insert -- methacrylic acid --.

Signed and Sealed this

Seventeenth Day of August 1982

[SEAL]

Attest:

Attesting Officer

GERALD J. MOSSINGHOFF
Commissioner of Patents and Trademarks